(12) United States Patent
Snyder et al.

(10) Patent No.: US 6,215,755 B1
(45) Date of Patent: Apr. 10, 2001

(54) OPTICAL DATA STORAGE TECHNOLOGY

(75) Inventors: James J. Snyder, Soquel; Ross Johnston, Santa Cruz; Stephen L. Kwiatkowski, Sunnyvale, all of CA (US)

(73) Assignee: Blue Sky Research, San Jose, CA (US)

( * ) Notice: Subject to any disclaimer, the term of this patent is extended or adjusted under 35 U.S.C. 154(b) by 0 days.

(21) Appl. No.: 09/169,041

(22) Filed: Oct. 9, 1998

(51) Int. Cl.[7] .................................................. G11B 7/135
(52) U.S. Cl. ..................... 369/112; 369/44.15; 369/44.14
(58) Field of Search .............................. 369/112, 44.12, 369/44.14, 44.28, 44.27, 44.15, 44.23

(56) References Cited

U.S. PATENT DOCUMENTS

| | | |
|---|---|---|
| 4,761,774 | 8/1988 | Ishibashi et al. .................. 369/44 |
| 4,959,824 * | 9/1990 | Ueda et al. .................. 369/44.14 |
| 5,199,020 * | 3/1993 | Kim et al. .................. 369/112 |
| 5,982,733 * | 11/1999 | Yanagawa et al. .................. 369/112 |

OTHER PUBLICATIONS

Handbook of Magneto–Optical Data Recording: Materials, Subsystems, Techniques (1996), edited by Terry W. McDaniel and Randall Victora, pp. 148–156.

* cited by examiner

*Primary Examiner*—Muhammad Edun
(74) *Attorney, Agent, or Firm*—Lariviere, Grubman & Payne, LLP

(57) ABSTRACT

A read/write arm for use in an optical memory system. The read/write arm of the present invention has reflective surfaces for directing an optical beam from the arm rotation axis on to an optical disk. The arm features a lightweight lens mounted at one end of the arm for focusing a light beam onto an optical disk. The focal distance of the light beam may be adjusted using piezoelectric actuators mounted on the read/write arm for precisely deflecting the arm. The light beam may be further adjusted through use of a relay lens interposed between a collimating lens and the object lens. This arrangement is advantageously optimized through the use of feedback loops.

44 Claims, 4 Drawing Sheets

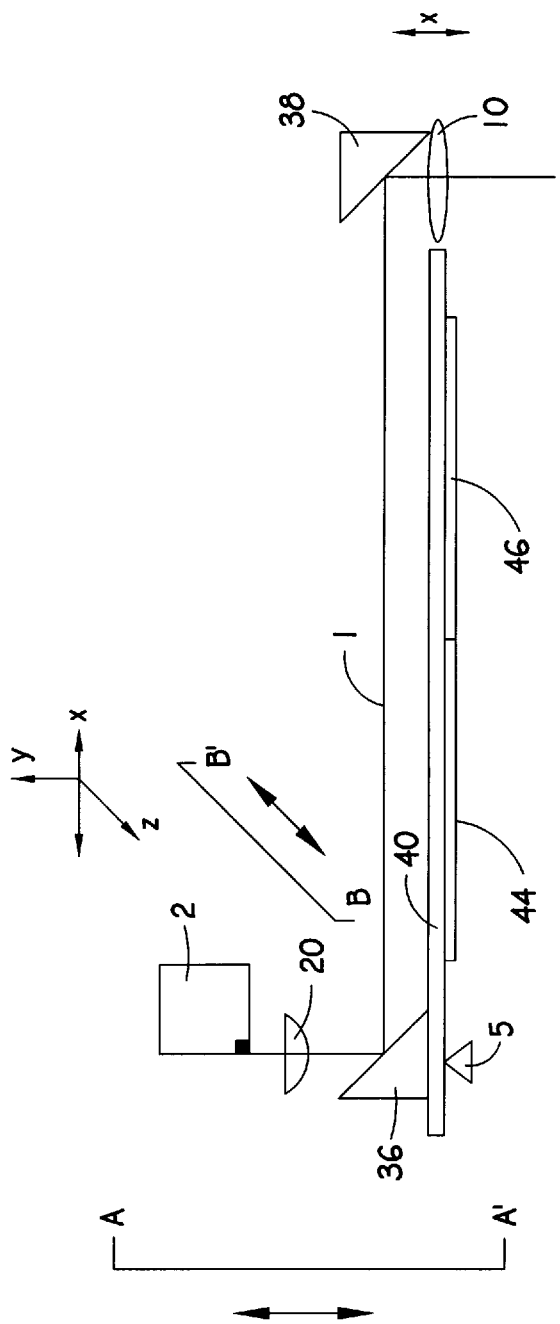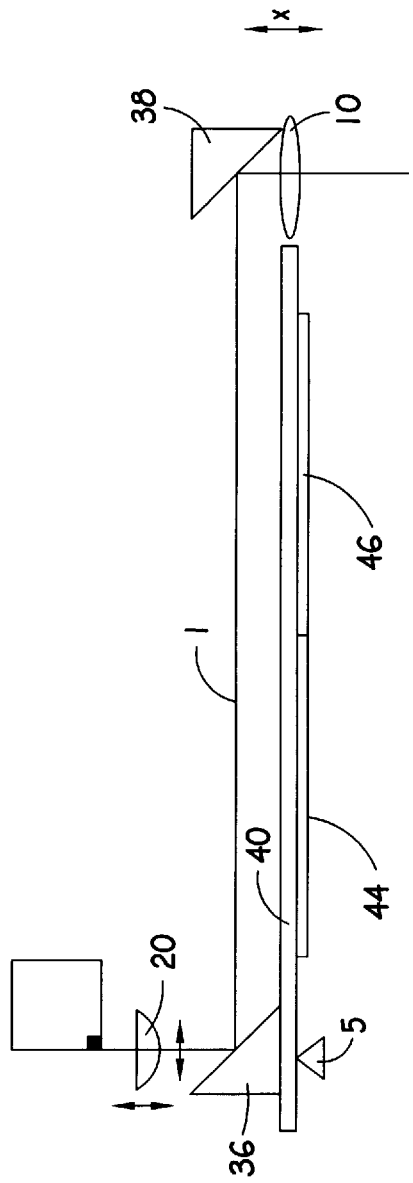

OPTICAL DATA STORAGE TECHNOLOGY

BACKGROUND OF THE INVENTION

The present invention relates to the recording and playback of data on an optical medium. More particularly, the present invention teaches a novel technology which enables the creation and retrieval of optically stored data at speeds approaching those attained by current magnetic hard drive technology.

BACKGROUND ART

Original mass storage devices for use with computers were generally serial type devices. Examples of these serial devices include the well-known punched paper tape and magnetic recording tape. These early serial storage devices were the norm until the advent of direct access storage devices (DASD). Examples of direct access storage devices include the well-known computer hard drive adapters. With the exception of the hard and floppy disk drives, mass storage devices, particularly those found in microcomputer applications, have historically tended to be formed from, or be adaptations of, serial entertainment storage devices. Examples of such storage devices include cassette tapes and CD-ROM drives. The access time for such devices suffers from their inherently serial nature.

The advent of the digital video disk (DVD) bodes well for increasing the storage capacity of the both removable and fixed computer drives. This increase in optical storage capacity has not heretofore been coupled with a concomitant decrease in access time. This is because, at their core technology, both CD-ROM and DVD drives are essentially serial storage devices, with all the inherent limitations thereof. And these limitations specifically included slow access times. Because of the relatively slow access times inherent in prior art CD-ROM and DVD technology, their utilization as direct access storage devices has not been realized.

The well-known CD-ROM drive is based on electro-optical device typically mounted on a truck or carriage which is actuated linearly to provide access to the information stored on the optical media, a rotating optical disk. The problem with this design is that the electro-optical device and the carriage (sled or sledge) which actuates it are relatively massive devices, ill-suited for rapid access speeds.

Hard disk access times are now routinely less than 10 msec. This is accomplished by mounting a very lightweight read/write head on a pivoting arm. The arm pivots substantially parallel to the surface of the magnetic media, and is positioned by means of voice-coil motors or other electrical positioning devices. The head typically flies at a height measured in millionths of an inch. The combination of the lightweight head pivoting under the impetus of a relatively powerful voice-coil motor enables the very fast access speeds currently attained by hard disk drives.

Heretofore, the mass of the CD-ROM electro-optical device and the truck on which it is mounted have precluded the attainment of access times approaching those currently attained by hard disks. This is because of the enormous forces the voice-coil motor would have to generate to achieve the desired accelerations of the massive carriage and optical assembly.

What is clearly needed is an optical, or magneto optical, drive technology which combines the reliability, removeability, and replaceability of CD-ROM or DVD technology with the low access times currently attained by hard drive technology.

What is further needed is a methodology which decreases the mass of the optical read/write assembly.

What is still further needed is a methodology which increases the data storage capacity of removable disk drives.

DISCLOSURE OF THE INVENTION

The present invention teaches a pivoting arm to move the objective lens of the DVD head, somewhat like the arm used for standard magnetic recording heads. The advantage of the rotating arm is that if it has low rotational inertia it can be swung across the disk much quicker than prior art carriage can be translated.

In order to keep the arm mass and rotational inertia low, the focus and tracking functions have been removed from the objective lens. In other words, the objective lens is now fixed rigidly to the tip of the arm.

The focusing function of the present invention is performed in two stages. High frequency, short dynamic range focusing motion is imparted to the first lens collecting light from the laser using a voice coil driven by a servo feedback loop. Low frequency, high dynamic range focusing motion is imparted by piezoelectrically articulating the arm to which the objective lens is attached. This articulation is again driven by the servo feedback loop.

Other features of the present invention are disclosed or apparent in the section entitled "BEST MODE OF CARRYING OUT THE INVENTION".

BRIEF DESCRIPTION OF THE DRAWINGS

For fuller understanding of the present invention, reference is made to the accompanying drawings taken in conjunction with the following detailed description of the Best Mode of Carrying Out the Invention. In the drawings:

FIG. 1 is an optical diagram of a first preferred embodiment of the present invention.

FIG. 2 is an optical diagram of a first preferred embodiment of the present invention, showing the effect of bimorph energization.

Figure 3:
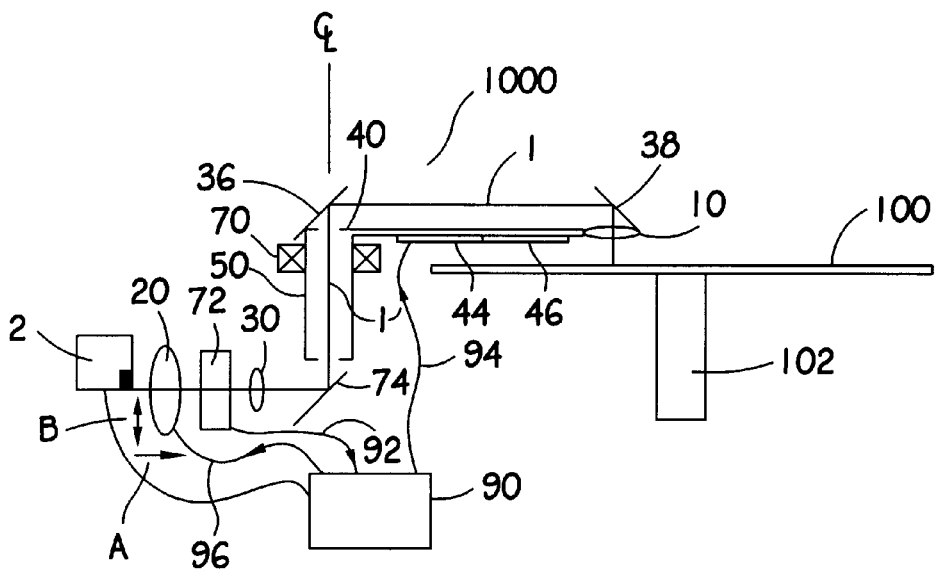
FIG. 3 is a cross-sectional representation of an optical read/write system implementing the first preferred embodiment of the present invention.

Reference numbers refer to the same or equivalent parts of the invention throughout the several figures of the drawings.

BEST MODE OF CARRYING OUT THE INVENTION

The principles of the present invention are illustrated in FIGS. 1 through 8. Having reference to FIGS. 1 and 2, the principles of operation of the first preferred embodiment of the present invention are shown. The optical read/write arm of the present invention comprises a flexible arm, 40, pivotably mounted in operative combination with a pivot, 5. Arm 40 is pivotably mounted with respect to pivot 5 such that arm 40 pivoted laterally about pivot 5. Pivot 5 is preferably, but not necessarily, mounted substantially near a first end of arm 40. Disposed at an opposite end of arm 40 is an objective lens, 10. Objective lens 10 may perform the read function, the write function, or both. Accordingly, it will be appreciated that in discussing the principles of the present invention the terms objective lens, read lens, write lens, and read/write lens are substantially interchangeable, and are differentiated primarily by their optical function and not by their physical arrangement with respect to other elements of the present invention.

Also disposed on arm 40 are a pair of fold mirrors, 36 and 38. Fold mirrors 36 and 38 are disposed such that a beam of light, 1, is directed from a location off of arm 40, along its length, and through the optical axis of objective lens 10. Moreover, fold mirrors 36 and 38 are disposed such that the axis of rotation about pivot 5 of arm 40 is equal to the optical axis of beam 1 from off arm 40 to on arm 40. Accordingly beam 1 from the collimating lens 20 is coupled to the tracking arm along its axis of rotation so that rotation of the arm does not displace beam 1 from the objective lens, 10.

There is provided a source of light, for instance a laser diode 2, preferably, but not necessarily off of arm 4. There is further provided a collimating lens 20 of collimating beam 1 as it exits diode 2. Collimating lens 20 is further fitted with at least two voice coils (not shown in this figure) for moving collimating lens 20 in the directions shown as A–A' and B–B' (noting that axis B–B' is in direction Z normal to the plane of the page). Motion in these directions is imparted to collimating lens 20 for the purposes of focusing and tracking beam 1, as will be later discussed.

Further fitted to arm 40 is a device for imparting a substantially linear motion which is substantially normal to the longitudinal axis of arm 40. In the preferred embodiments of the present invention shown in FIGS. 1 through 5, there are fitted a pair of piezoelectric bender actuators, 44 and 46. One type of bender actuator particularly suitable for the implementation of this embodiment of the present invention is the model P-803.50 available from Physik Instrumente (PI) GmbH & Co., Polytec-Platz 1-7, D-76337, Waldbronn, Germany. Hereinafter the terms "bender actuator" and "bimorph" are used interchangeably.

In the first preferred embodiment of the present invention, bimorphs 44 and 46 are disposed upon and in intimate contact with arm 40. This intimate contact may be maintained by means of adhesive, soldering, brazing, welding, the formation of bimorphs 44 and 46 directly upon a surface of arm 40, or other attachment methodologies well known to those having ordinary skill in the art. Moreover, the principles of the present invention contemplate the attachment of bimorphs 44 and 46 to opposing surfaces of arm 40.

Bimorphs 44 and 46 are disposed upon arm 40 in such manner so that when simultaneously energized, they deflect in opposing directions. As shown in FIG. 1, bimorphs 44 and 46 are not energized. Having reference now to FIG. 2, the effect of energizing bimorphs 44 and 46 is to impart a substantially S-shaped curve to arm 40. This in turn imparts the substantially linear motion shown at X by which is meant substantially rectilinear translation of the end of the arm 40 to which lens 10 is attached (i.e., distal end of arm 40) along axis X while maintaining fixed orientation of the distal end. In a first preferred embodiment of the present invention, the deflection shown at X is in the range of approximately 1 mm. This range of deflection is highly application dependent, and it will be obvious to one having ordinary skill in the art that alternative deflection ranges may, with equal facility, be implemented. It should be noted that the deflection shown in FIG. 2 has been substantially exaggerated for illustrational purposes.

While the first preferred embodiment of the present invention contemplates the use of multilayer bimorphs as shown and discussed in FIGS. 1 through 5, the principles of the present invention specifically contemplate the utilization of alternative methodologies for imparting the substantially linear motion shown at x. These alternative methodologies include, but are specifically not limited to, the use of: articulated parallelograms; alternative electric linear actuators including servos, voice coils and the like; pneumatic cylinders or other pneumatic actuation methodologies; hydraulic cylinders or other hydraulic actuation methodologies; and other linear actuating methodologies well known to those having ordinary skill in the art.

In this manner, when the feedback loop detects the need for a low frequency, large range of dynamic focusing motion, bimorphs 44 and 46 may be proportionally energized. As bimorph 44 is energized, it differentially expands to a greater degree on its lower surface. As bimorph 46 is energized it differentially expands to a greater degree on its upper surface. This causes the S-shaped flexure shown at FIG. 2, which applies a relatively large range of dynamic motion at a low frequency for performing gross focusing function.

In this embodiment, collimating lens 20 is maintained in a flexure suspension incorporating one or more voice coils.

High frequency focusing capable of small ranges of dynamic motion is accomplished by moving collimating lens 20 along the optical axis of beam 1 by means of voice coils, not shown. Tracking is performed by moving collimating lens 20 normal to the optical axis defined by beam 1.

The combination of the substantially linear motion at X in combination with the motion imparted at A provides for two elements of focusing beam 1 onto an optical surface (not shown). Bimorphs 44 and 46 provide a large range of dynamic motion at a low frequency. The actuation of collimating lens 20 by the previously discussed voice coils (not shown) provide a small range of dynamic motion at a high response frequency. In this manner, focusing errors engendered by disk run out as well as surface irregularity are compensated for and corrected.

Figure 4:
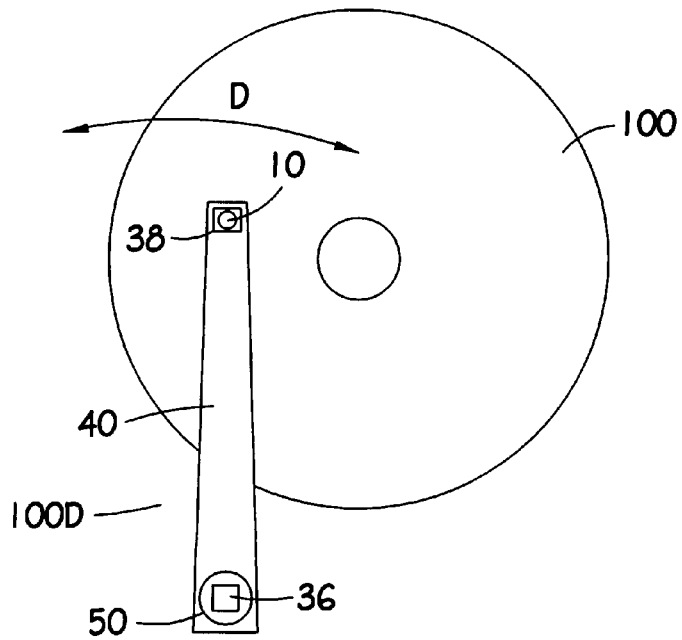
FIG. 4 is a plan view of an optical read/write system implementing the first preferred embodiment of the present invention, showing its relationship to an optical disk.

An optical pickup arm embodying the principles of the first preferred embodiment of the present invention is shown at FIGS. 3 and 4. Having reference to that figure, optical pickup arm 1000 comprises arm 40 in operative combination with bimorphs 44 and 46, fold mirrors 36 and 38, and objective lens 10, as previously discussed. The pivot function, previously discussed, is provided by mounting arm 40 to pivot tube 50. Pivot tube 50 is supported by bearing 70 which enables the arcuate motion shown at D in FIG. 4. Bearing 70 further maintains the mechanical and optical alignment of pickup arm assembly 1000 with respect to disk 100. Optical pickup arm 1000 is urged in its arcuate motion shown at D in the manner well known to those having ordinary skill in computer disk hard drive technology.

In order to minimize the response time of pickup arm assembly 1000, it is necessary to minimize its mass and its rotational inertia. One of the principal features of the present invention is the ability to move many of the relatively massive electrical, electronic, and optical elements heretofore required off of the optical pickup unit itself. this is enabled by the structure shown at FIG. 3. By aligning beam 1 at 1' concentric with the axis of rotation of pivot tube 50, substantially all of the optical, electrical, electronic, and electro-optical elements required by optical pickup technologies can be removed from the optical pickup arm assembly itself, with the exception of objective lens 10 and fold mirrors 36 and 38. As the use of collimated light enables small features sizes for these elements, it will be appreciated that the contribution of their mass to the total massive pickup arm assembly 1000 is relatively small. Moreover the principles of the present invention contemplates the use of very small objective lenses 10, which further minimizes the mass of pickup arm assembly 1000 and hence its rotational inertia. Aspherical lenses suitable for use as objective lens 10 are available from Geltech, Inc., Orlando, Fla.

In the first preferred embodiment shown in FIGS. 3 and 4, laser diode 2, collimating lens 20, and additional optical and electronic elements 30 and 72 are mounted off of an optical pickup arm assembly 1000. In this embodiment the opticalsystem previously discussed is somewhat modified to include a relay, or field, lens 30, hereinafter discussed. The inclusion of relay lens 30 changes the character of collimating lens 20 from a collimator to an image forming lens. While, strictly speaking, this is optically incorrect, the term "collimating lens" will be utilized throughout the disclosure for consistency and simplicity.

Also shown in FIG. 3 is a light receiving element 72 which is utilized to provide optical feedback regarding focusing and tracking to servo loop 90 at 92. In response to tracking and focusing information received from light receiving element 72, servo loop 900 provides low frequency signals to bimorphs 44 and 46 at 94, and high frequency signals to the voice coils (not shown) at 96 which actuate collimating lens 20 in the directions A and B for focusing and tracking respectively. The principles of the present invention specifically contemplate the utilization of composite holographic laser devices to combine one or more of the functions herein discussed. One such holographic laser device combining the functions of diode 2 and light receiving element 72 is the Sharp Model LTOH49 holographic laser. Other holographic laser devices further incorporating the functions of collimating lens 20 and its associated voice coils are also contemplated by the principles of the present invention.

As disk 100 is rotated about its axis, 102, disk run out may be engendered by disk warp, misalignment, or other disk errors or imperfections in its drive unit. Moreover, formation of the optical surface of disk 100 may itself be subject to minor imperfections. In combination, these imperfections serve to mandate an active focusing system, as previously discussed. The utilization of servo loop 90 and its associated signals 92, 94, 96, and 98 is discussed in *The Physical Principles Of Magneto Optic Recording,* Masud Mansuripur, Cambridge University Press, 1995, for instance at pp. 27 et seq., which text is herewith incorporated by reference in its entirety.

Figure 5:
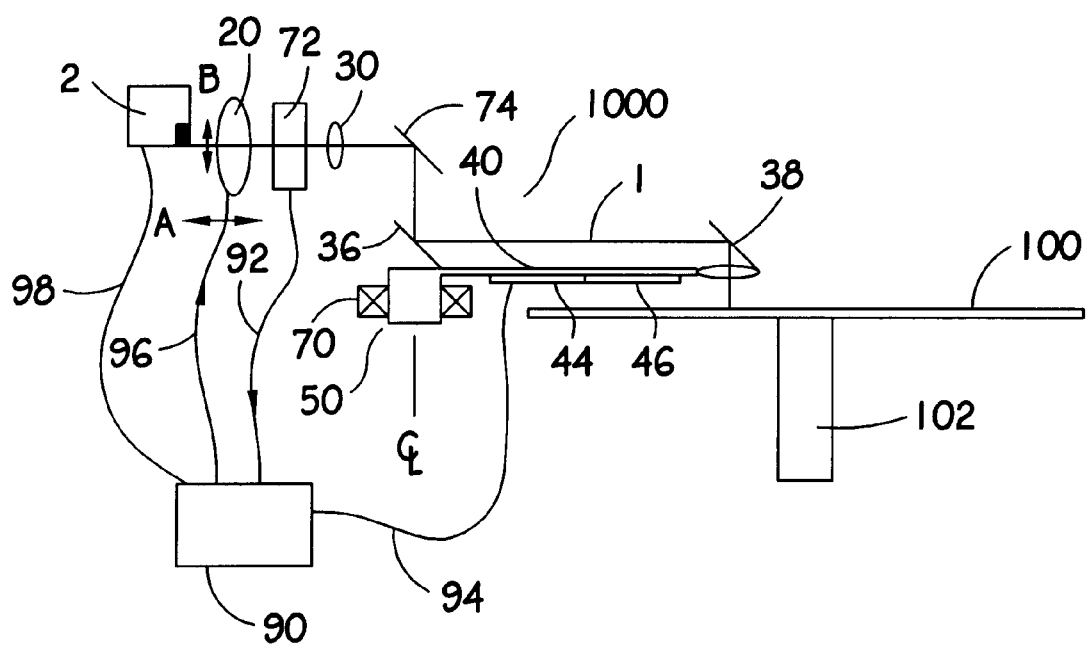
FIG. 5 is a cross-sectional representation of an optical read/write system implementing a second preferred embodiment of the present invention.

An alternative to the first preferred embodiment previously discussed is shown at FIG. 5. This alternative contemplates the placement of diode 2 and associated optical, electronic, and electrical elements above optical pickup arm assembly 1000. In this embodiment, pivot tube 50 need not be hollow. Fold mirror 74 is optically aligned above fold mirror 36 to maintain the optical alignment of beam 1 concentric with the axis of rotation of optical pickup arm 1000.

The previously discussed tracking and focusing functions are performed utilizing voice coils, feedback loops and photo-detectors well known to those having ordinary skill in the art and fully discussed in the incorporated reference. One way to implement the optical laser diode and photo-detectors to drive the controlling servo loop is to utilize a combination device. One such device is a Sharp holographic laster LTOH49, available from Sharp Digital Information Products, Huntington Beach, Calif.

Figure 6:
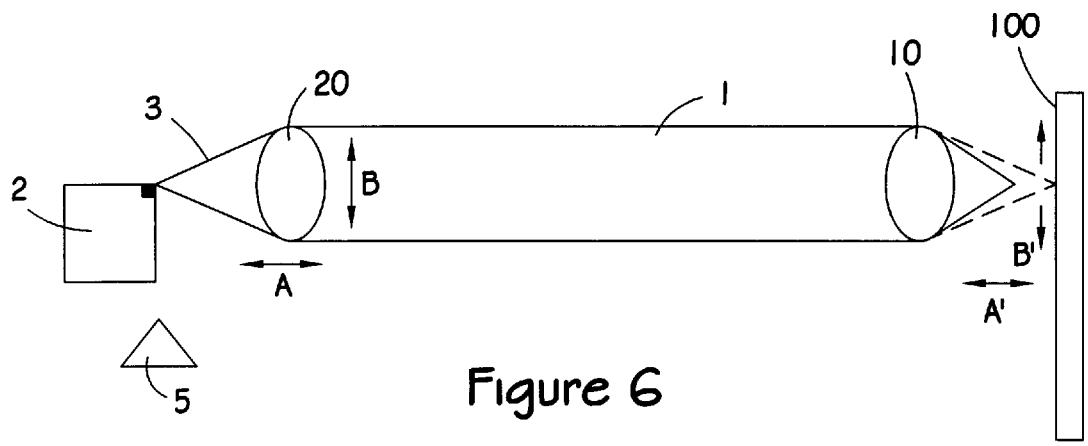
FIG. 6 is an optical diagram of one embodiment of the present invention.
Figure 7:
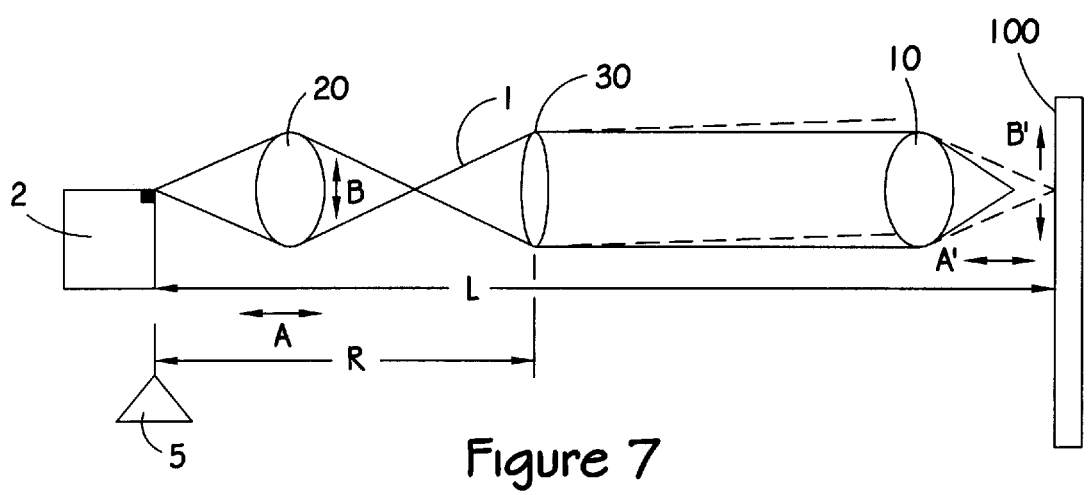
FIG. 7 is an optical diagram of a preferred embodiment of the present invention.
Figure 8:
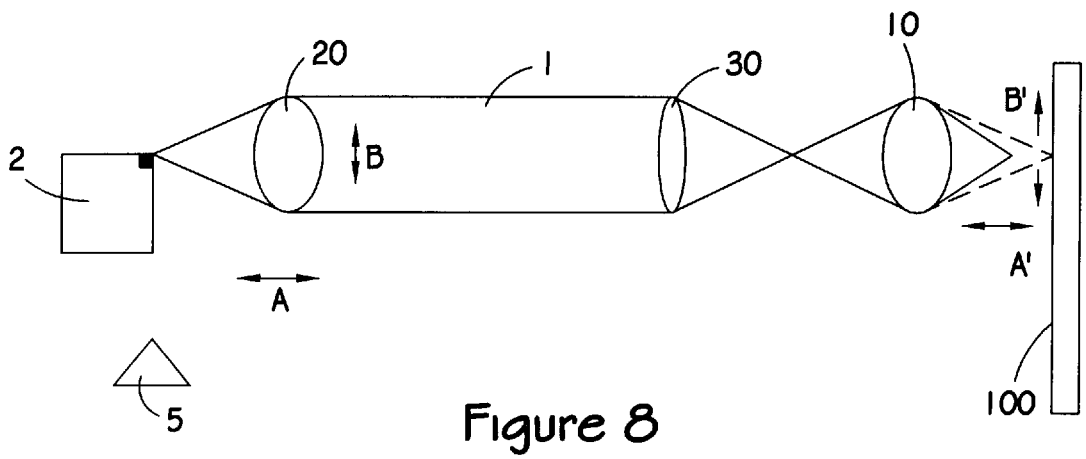
FIG. 8 is an optical diagram of an embodiment of the present invention.

Beam 1 may be formed in a number of different manners, some of which are shown in FIGS. 6 through 8.

Having reference now to FIG. 6, a first beam forming methodology is presented. In this embodiment of the present invention, beam 1 is formed the previously discussed collimating lens 20. Beam 1 in this embodiment is formed by the collimating of the output beam 3 from diode 2. Moving collimating lens 20 as shown at A' and B'.

To minimize potential problems inherent in the design shown in FIG. 6, the utilization of field lens, 30, as shown in FIGS. 7 and 8 is taught by the principles of the present invention. In this embodiment, field lens 30 images the collimating lens 20 onto the objective lens 10.

A first preferred embodiment of the present invention contemplates the implementation of the optical system shown in FIG. 7. This embodiment contemplates the total path length, L, of 150 mm, and has the field lens 30 centered at distance, R, of about 75 mm. Collimating lens 20 forms an intermediate real image on the left side of the field lens 30. In this manner the collimating lens becomes finite conjugate and the objective lens' power is reduced. The optical system prescription for a preferred embodiment intended for DVD applications is as follows:

| \multicolumn{6}{c}{LENS UNIT ARE MM} | | | | | |
|---|---|---|---|---|---|
| EFL-Y | BF | F/NBH | LENGTH | OID | T-MAG |
| −3.4782 | 2.1418 | −0.87 | 141.3563 | 1.51352E−02 | 0.227735 |
| −3.4782 | 2.1418 | −0.87 | 141.3563 | 1.51352E−02 | 0.227735 |

| \multicolumn{5}{c}{REFERENCE DATA-YZ PLANE} | | | | |
|---|---|---|---|---|
| REF OBT HT | REF AP HT | OBJ SURF | REF SURF | IMG SURF |
| 1.857887E−01 (−1.065 DG) | 5.0000 | 0 | 3 | 14 |

| \multicolumn{5}{c}{REFERENCE DATA-XZ PLANE} | | | | |
|---|---|---|---|---|
| REF ABT HT | REF AP HT | OBJ SURF | REF SURF | IMG SURF |
| 1.857887E01 (−1.065 DG) | 5.0000 | 0 | 3 | 14 |

REF. OBJECT Z-NORMALIZATION = 1.00000
APERTURE STOP AT SURF 3

| \multicolumn{7}{c}{BASIC LENS DATA} | | | | | | |
|---|---|---|---|---|---|---|
| SURF | RD | TH | MEDIUM | | RN | DF |
| 0 | 4.150210 | 9.995446 | AIR | | | Diode Source |
| 1 | 8.715377 | 3.600000 | MATL | ACRYL | 1.489401 | 0.000 Diode |
| 2 | −6.918381 | 1.200000 | AIR | | | Collimator |
| 3 | 0.000000 | 31.000000 | AIR | | | Apert Stop |
| 4 | 0.000000 | 32.000000 | AIR | | | Int Focus |
| 5 | 129.721814 | 2.133333 | MATL | ACRYL | 1.489401 | 0.000 Collimating |
| 6 | −18.512089 | 67.263203 | AIR | | | Relay Lens |
| 7 | 0.000000 | 1.500000 | AIR | | | Plotdummy |
| 8 | 0.000000 | 0.800000 | AIR | | | Stop @ Lens |
| 9 | 1.544486 | 1.429843 | MATL | ACRYL | 1.489401 | 0.000 (Biaspheric) |
| 10 | −5.033665 | 1.429898 | AIR | | | Acrylic |
| 11 | 0.000000 | 0.600000 | MATL | PLYCARB | 1.580296 | 0.000 DVD PolyCarb |
| 12 | 0.000000 | −2.141756 | AIR | | | Cvr Plate |
| 13 | 0.000000 | 2.141756 | AIR | | | Exit Pupil |
| 14 | −1.108390 | 0.000000 | AIR | | | Focus |

| \multicolumn{7}{c}{CC AND ASPHERIC DATA} | | | | | | |
|---|---|---|---|---|---|---|
| SURF | CC | AD | AE | AF | AG | |
| 2 | −1.00651E−00 | 5.38428E−04 | 8.81598E−06 | 0.00000E−00 | 0.00000E−00 | Collimator |
| 6 | −7.68827E−01 | | | | | Relay Lens |
| 9 | −7.22240E−01 | 6.47793E−03 | 7.18703E−04 | 9.22745E−04 | −2.92105E−04 | Biaspheric) |
| 10 | −1.98479E+01 | 1.23586E−02 | 1.17397E−04 | −2.15657E−03 | 4.67858E−04 | Acrylic |

| \multicolumn{7}{c}{CLEAN APERTURES AND OBSTRUCTION} | | | | | | |
|---|---|---|---|---|---|---|
| SURF | TYPE | OAY OAX | | Y OFFSET | X OFFSET | |
| 1 | CIRCLE | 5.0000 | | 0.0000 | 0.0000 | Diode |
| 2 | CIRCLE | 5.0000 | | 0.0000 | 0.0000 | Callimator |
| 3 | CIRCLE | 1.5000 | | 0.0000 | 0.0000 | Aper Stop |
| 5 | CIRCLE | 5.3333 | | 0.0000 | 0.0000 | Collimating |
| 6 | CIRCLE | 5.3333 | | 0.0000 | 0.0000 | Relay Lens |
| 8 | CIRCLE | 1.5000 | | 0.0000 | 0.0000 | Stop @ Lens |
| 9 | CIRCLE | 1.6556 | | 0.0000 | 0.0000 | (Biaspheric) |
| 10 | CIRCLE | 1.6556 | | 0.0000 | 0.0000 | Acrylic |
| 11 | CIRCLE | 1.5000 | | 0.0000 | 0.0000 | DVD PolyCarb |
| 12 | CIRCLE | 1.5000 | | 0.0000 | 0.0000 | Cvr Plate |

WAVE NBR        1
WAVELENGTH  0.65000
SPECTRAL WT  1.0000

| \multicolumn{4}{c}{REFRACTIVE INDICES. MODE IS RELATIVE} | | | |
|---|---|---|---|
| SURF | N1 | ABBE | |
| 1 | 1.489401 | 0.489 | Diode |
| 5 | 1.489401 | 0.489 | Collimating |

-continued

| | | | |
|---|---|---|---|
| 9 | 1.489401 | 0.489 | (Biaspheric) |
| 11 | 1.580296 | 0.580 | DVD PolyCarb |

PICKUPS

| SURF | TYPE | J | A | B | |
|---|---|---|---|---|---|
| 13 | TH | 12 | −1.0000 | 0.00000 | ExitPupil |

SOLVES

| SURF | TYPE | PARAMETER | VALUE | SLV DATUM | |
|---|---|---|---|---|---|
| 12 | PCT | TH | −2.141756 | 0.00000 | CvrPlate |

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. In particular, it will be obvious to those of ordinary skill in the art that alternate optical arrangements implementing the features and advantages taught herein may be utilized without departing from the principles of the present invention. Some of these modifications include alternative placement for one or more of the optical, electrical, electronic, or electro-optical devices herein discussed. Specifically, the principles of the present invention contemplate the placement of one or more of these elements on arm 40 where required. Moreover, one or more of these elements may be combined into a unitary package, for instance the previously discussed holographic laser assemblies. The principles of the present invention specifically contemplate all such implementations and combinations. The invention disclosed herein may be practiced without any element which is not specifically disclosed herein.

What is claimed is:

1. An opto-mechanical system having a movable surface comprising:
    a tracking arm;
    light means for forming a light beam, said light means positioned at a location off of said tracking arm;
    a first lens positioned at a location off of said tracking arm and disposed in the path of the light beam;
    a second lens fixedly mounted at an end said tracking arm and disposed in the path of the light beam;
    first control means for controlling the relative position between the light means and the first lens to provide high frequency control of the light beam on the movable surface; and
    second control means for controlling the relative position between the second lens and the movable surface, to provide low frequency control of the light beam on the movable surface.

2. A system as in claim 1, wherein the high frequency control comprises control of the focus of the light beam on the movable surface.

3. A system as in claim 1, wherein the high frequency control comprises control of the position of the light beam on the movable surface.

4. A system as in claim 1, wherein the high frequency control comprises control of the focus and the position of the light beam on the movable surface.

5. A system as in claims 1, 2, 3, or 4, in which the low frequency control comprises control of the focus of the light beam on the movable surface.

6. A system as in claims 1, 2, 3, or 4, in which the low frequency control comprises control of the position of the light beam on the movable surface.

7. A system as in claims 1, 2, 3, or 4, in which the low frequency control comprises control of the focus and the position of the light beam on the movable surface.

8. An opto-mechanical system as in claim 1, wherein the control means translates the second lens normal to the movable surface while maintaining a fixed orientation of the second lens.

9. An opto-mechanical system as in claim 1, wherein the control means translates the second lens relative to the movable surface while maintaining a fixed orientation of the second lens.

10. An opto-mechanical system as in claim 1, wherein the control means translates the second lens parallel to the movable surface while maintaining a fixed orientation of the second lens.

11. A system as in claims 8, 9, or 10, further including an actuator arm on which the second lens is mounted.

12. A system as in claim 11, wherein the actuator arm includes control elements, coupled to the control means, for controlling the position and orientation of the second lens.

13. A system as in claim 12, wherein the control elements impart an S-shape to the actuator arm, for maintaining fixed orientation of the second lens during translation thereof.

14. A system as in claims 1, 2, 3, 4, 8, 9, or 10 further comprising a relay lens disposed in the path of the light beam between said first lens and said second lens.

15. A system as in claims 1, 2, 3, 4, 8, 9, or 10 for use in rotating disk memory systems.

16. A system as in claim 15, wherein said rotating disk memory system is an optical rotating disk memory system.

17. An opto-mechanical system comprising:
    a tracking arm;
    a light source positioned at a location off of said tracking arm;
    an objective optic, disposed in the path of said light source, and fixedly mounted at one end of the tracking arm;
    a light collecting lens, disposed in the path of said light source and positioned at a location off of said tracking arm; and control means for controlling said tracking arm to control the position of said objective optic in relation to a moveable surface and for controlling the relative position between said light source and light collecting lens.

18. A system as in claim 17, further including a movable surface, wherein said objective optic is translated substantially normal to the movable surface while simultaneously maintaining fixed orientation of said objective optic.

19. A system as in claim 18, further including a first lens disposed in the path of the light beam and coupled to said control means for controlling the position of said first lens with respect to said light source for focusing the light beam on said movable surface.

20. A system as in claim 19, wherein the control means is coupled to said light source for controlling the distance between said first lens and said light source for focusing the light beam on said movable surface.

21. A system as in claims 17, 18, 19, or 20, wherein said controllably deformable actuator arm comprises a parallelogram structure.

22. A system as in claim 21 for use in rotating disk memory systems.

23. A system as in claim 22 wherein said rotating disk memory system is an optical disk memory system.

24. A system as in claim 17, wherein said actuator arm includes control elements, coupled to said control means, for controlling the position and orientation of the objective optic.

25. A system as in claim 24, wherein said control elements are piezoelectric bender actuators, for controlling the position and orientation of the objective optic.

26. A system as in claim 24, wherein said control elements impart an S-shape to said actuator arm for maintaining fixed orientation of the objective optic during translation thereof.

27. A system as in claims 17, 18, 19, 20, 24, 25, or 26 for use in rotating disk memory systems.

28. A system as in claim 27 for use in rotating disk memory systems.

29. A system as in claim 28, wherein said rotating disk memory system is an optical disk memory system.

30. A method of focusing and directing a light beam onto a movable surface, comprising the steps of:
   forming a light beam with a light source;
   disposing a first lens in the path of the light beam;
   disposing a second lens in the path of the light beam, said second lens fixedly mounted to an end of a tracking arm;
   controlling the relative position between the light source and the first lens to provide high frequency control of the light beam on the movable surface; and
   controlling the relative position between the second lens and said movable surface by deflecting said actuator arm, to provide low frequency control of the light beam on the surface, wherein said light source and said first lens are positioned off of said tracking arm.

31. A method as in claim 30, wherein said step of high frequency control includes the step of controlling the focus of the light beam on the movable surface.

32. A method as in claim 30, wherein said step of high frequency control includes the step of controlling the position of the light beam on the movable surface.

33. A method as in claim 30, wherein said step of high frequency control includes the step of controlling the focus and the position of the light beam on the movable surface.

34. A method as in claims 30, 31, 32, or 33, wherein said step of low frequency control includes the step of controlling the focus of the light beam on the movable surface.

35. A method as in claims 30, 31, 32, or 33, wherein said step of low frequency control includes the step of controlling the position of the light beam on the movable surface.

36. A method as in claims 30, 31, 32, or 33, wherein said step of low frequency control includes the steps of controlling the focus and the position of the light beam on the movable surface.

37. A method as in claim 30, wherein said step of low frequency control includes the step of translating the second lens normal to the movable surface while maintaining a fixed orientation of the second lens.

38. A method as in claim 30, wherein said step of low frequency control includes the step of translating the second lens relative to the movable surface while maintaining a fixed orientation of the second lens.

39. A method as in claim 30, wherein said step of low frequency control includes the step of translating the second lens parallel to the movable surface while maintaining a fixed orientation of the second lens.

40. A system as in claims 37, 38, or 39, wherein said step of low frequency control further includes the step of providing an actuator arm on which the second lens is mounted.

41. A method as in claim 40, wherein said step of providing an actuator arm, includes the step of including control elements therewith, for controlling the position and orientation of said second lens.

42. A method as in claim 41, wherein said step of including said control elements includes the step of imparting an S-shape to the actuator arm for maintaining fixed orientation of the second lens during translation thereof.

43. A method as in claims 30, 31, 32, 33, 37, 38, or 39 wherein said step of providing a movable surface comprises providing a rotating memory disk surface.

44. A method as in claim 43, wherein said step of providing said rotating memory disk surface comprises providing an optical rotating disk memory surface.

* * * * *

UNITED STATES PATENT AND TRADEMARK OFFICE
CERTIFICATE OF CORRECTION

PATENT NO. : 6,215,755 B1          Page 1 of 1
DATED : April 10, 2001
INVENTOR(S) : James J. Snyder, Ross Johnston and Stephen L. Kwiatkow It is certified that error appears in the above-identified patent and that said Letters Patent is hereby corrected as shown below:

Column 3,
Line 35, after the word "arm" delete [4] and replace with -- 40 --.

Column 5,
Line 38, the first word "opticalsystem" delete [opticalsystem] and replace with -- optical system --.

Signed and Sealed this

Thirtieth Day of October, 2001

Attest:

NICHOLAS P. GODICI
Attesting Officer     Acting Director of the United States Patent and Trademark Office